Nov. 18, 1924.

F. C. HOLSTEIN

POLE STRAP

Filed March 26, 1924

1,516,292

INVENTOR.
Fred C. Holstein
BY
Philip A. H. Jerrell
ATTORNEY.

Patented Nov. 18, 1924.

1,516,292

UNITED STATES PATENT OFFICE.

FREDERICK C. HOLSTEIN, OF HERMAN, NEBRASKA.

POLE STRAP.

Application filed March 26, 1924. Serial No. 702,075.

*To all whom it may concern:*

Be it known that FREDERICK C. HOLSTEIN, a citizen of the United States, residing at Herman, in the county of Burt and State of Nebraska, has invented certain new and useful Improvements in Pole Straps, of which the following is a specification.

The invention has for its object to provide a pole strap, a part of harness used on horses when hitched to a wagon or other vehicle provided with a wagon tongue, and to provide a pole strap which will prevent the wagon from coming into engagement with the horse incident to the shortness of the tongue of the wagon. Also to provide means whereby said pole strap may be shortened or lengthened.

It has been found that the ordinary pole strap, not having a convenient means of adjustment, is not satisfactory for the reason that horses hitched to a wagon, or other implement with a tongue shorter than a standard tongue, are in danger of the wagon or other implement running onto them in going down inclines, for the reason that the pole strap not being adjusted to the short tongue does not serve to hold the wagon or other vehicle at a proper distance behind the horses.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
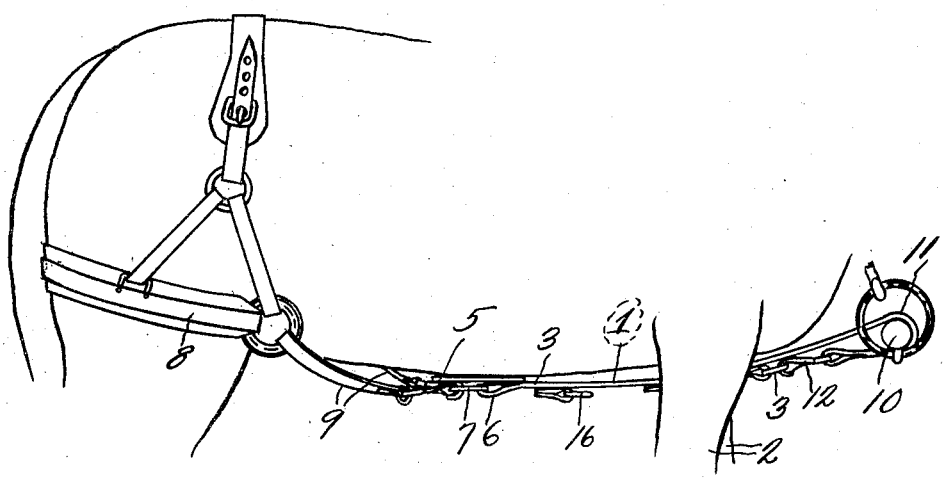
Figure 1 is a side elevation of the pole strap showing the same applied to the harness on a horse.
Figure 2:
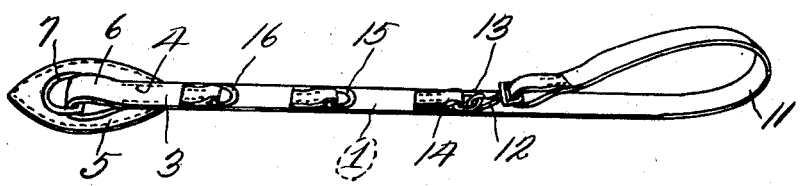
Figure 2 is a bottom perspective view of the pole strap.

Referring to the drawing, the numeral 1 designates the pole strap, which is disposed under the stomach of the horse and extends forwardly between the front legs 2 thereof. The pole strap has its rear end 3 secured at 4 to a pad 5 which engages the stomach of the horse and prevents rubbing thereof. The rear end of the pole strap 1 is provided with a loop 6 having a ring 7, which is connected to the breeches 8 by means of diverging straps 9, whereby when the wagon and horse are going down hill the holding back strain from the pole yoke 10 will be on the rear end of the horse. The forward end of the strap 1 is provided with a loop 11 which extends around the yoke 10 and terminates in a snap hook 12, which is hooked in the ring 13 of the hook 14 secured to the under side of the strap. The ring 13 is positioned for a standard length tongue, however it has been found that where a tongue is used, which is shorter than a standard length tongue, when the horse and wagon are going down hill, the wagon moves forwardly until it comes into engagement with the horse. To obviate this difficulty the strap 1 is provided with rings 15 and 16 disposed nearer the rear end 3 thereof, and into any of which rings the snap hook 12 may be hooked, thereby shortening the pole strap, and consequently the pole strap will maintain the wagon at a proper distance behind the horse in going down an incline even if the pole is shorter than a standard pole.

From the above it will be seen that a pole strap is provided for harness, which may be adjusted for maintaining a wagon or other vehicle at a proper distance from horses attached thereto at all times, and may be adjusted to accommodate itself to standard length poles or tongues, and to poles or tongues shorter than standard length.

The invention having been set forth what is claimed as new and useful is:—

In a harness, the combination of a wagon tongue yoke provided with a pole, a breech strap, a pole strap adapted to be disposed beneath the stomach of a horse, said pole strap having its rear end provided with a ring, diverging rearwardly extending straps connecting the pole strap to the breech strap, the forward end of said pole strap extending over the yoke pole, said forward end of the pole strap being provided with a snap hook, and a plurality of spaced rings carried by the under side of the pole strap to any of which the snap hook may be attached.

In testimony whereof I affix my signature.

FREDERICK C. HOLSTEIN.